United States Patent
Fiat et al.

(10) Patent No.: US 7,936,726 B2
(45) Date of Patent: May 3, 2011

(54) METHOD FOR FAST RADIO LINK MEASUREMENTS OF ACCESS POINT CANDIDATES FOR WLAN HANDOVER, A MOBILE TERMINAL, AN ACCESS POINT AND PROGRAM MODULES THEREOF

(75) Inventors: Lionel Fiat, Paris (FR); Philippe Dauchy, Paris (FR)

(73) Assignee: Alcatel Lucent, Paris (FR)

( * ) Notice: Subject to any disclaimer, the term of this patent is extended or adjusted under 35 U.S.C. 154(b) by 536 days.

(21) Appl. No.: 11/577,990

(22) PCT Filed: Oct. 25, 2005

(86) PCT No.: PCT/EP2005/055531
§ 371 (c)(1),
(2), (4) Date: Apr. 25, 2007

(87) PCT Pub. No.: WO2006/045797
PCT Pub. Date: May 4, 2006

(65) Prior Publication Data
US 2009/0135785 A1    May 28, 2009

(30) Foreign Application Priority Data
Oct. 26, 2004   (EP) .................................... 04292545

(51) Int. Cl.
*H04W 4/00* (2009.01)

(52) U.S. Cl. ............................ 370/332; 370/331; 370/338
(58) Field of Classification Search .................. 370/332, 370/331, 338
See application file for complete search history.

(56) References Cited

FOREIGN PATENT DOCUMENTS

| EP | 1 345 370 A2 | 9/2003 |
| EP | 1 441 469 A2 | 7/2004 |
| WO | WO 03034669 A1 | 4/2003 |

OTHER PUBLICATIONS

Moo Ryong Jeong et al, "Proposed Text for Fast Active Scan", IEEE P802.11-03-0623RO, 'Online! Jul. 10, 2003, pp. 1-6, XP002321626.
Hye-Soo Kim et al, "Selective Channel Scanning for fast handoff in Wireless LAN using Neighbor Graph", ITC-CSCC2004, 'Online! Jul. 6-8, 2004, pp. 1-4, XP002321627.
Moo Ryong Jeong et al, "Fast Active Scan Proposals", IEEE 802.11-03-623RO, 'Online! Jul. 2003, pp. 1-17, XP002321625.

*Primary Examiner* — Charles Shedrick
(74) *Attorney, Agent, or Firm* — Fay Sharpe LLP

(57) ABSTRACT

The invention concerns a method for fast determination of the quality of the radio link from a mobile terminal (STA) to an access point (AP1) in a Wireless Local Area Network whereby after having received a probe request message (PRU1) from the mobile terminal (STA), the access point (AP1) does not send a probe response message (PRE1) to said mobile terminal (STA), a mobile terminal (STA), an access point (AP1) and program modules therefore.

8 Claims, 1 Drawing Sheet

Figure 1:
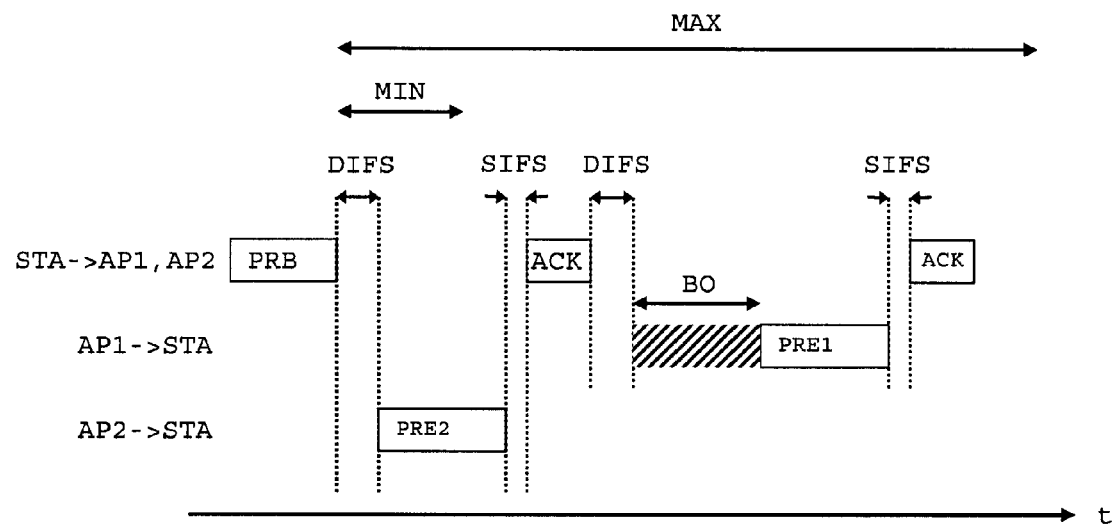

METHOD FOR FAST RADIO LINK MEASUREMENTS OF ACCESS POINT CANDIDATES FOR WLAN HANDOVER, A MOBILE TERMINAL, AN ACCESS POINT AND PROGRAM MODULES THEREOF

A method for fast radio link measurements of access point candidates for WLAN handover, a mobile terminal, an access point and program modules therefore The invention relates to a method for fast determination of the quality of a radio link in a Wireless Local Area Network (WLAN) according to the preamble of claim 1, a mobile terminal according to the preamble of claim 4, an access point according to the preamble of claim 10 and program modules according to the preambles of claims 7 and 12.

The WLAN standards IEEE 802.11a/b/g are experiencing a successful development. This success is mainly based upon the use of these standards in enterprise networks, hot spots and at home, i.e. conference centers, railway stations, airports, hotels and so on. In these environments, Voice over Internet Protocol (VoIP) and Voice over WLAN (VoWLAN) are becoming attractive technologies with the main goal to reduce the communication costs by merging data and voice networks.

Offering real time handover is an essential requirement for VoWLAN and other real time services like video conferences and therefore the handover between two WLAN access points is an active subject of research because the handover time has to be drastically reduced in order to allow VoWLAN seamless mobility between two IEEE 802.11 access points.

During a handover, one phase consists in measuring (scanning) the radio link qualities of potential candidate access points. The IEEE 802.11 standard only defines quite slow methods for passive and active scanning to perform these measurements. Active scanning according to the IEEE 802.11 standard is the faster one, but it is still too long to carry out a fast handover in accordance with real time service requirements.

The IEEE 802.11 standard active scanning is implemented in such a way that the mobile terminal sends a broadcast probe request for each IEEE 802.11 channel and awaits for each channel the responses from each potential candidate access point of this channel. Each potential candidate access point may respond with a delay, so for each channel the mobile terminal has to wait a significant delay to discover and measure radio link quality of the access points that it can join. This significant delay is dependent on the number of access points and has a value of about 15 ms in case of three access points. A typical default value used for this significant delay is about 20 ms.

In order to speed up the probe exchange by means of enabling an access point to send back faster the probe response, some contributions to the IEEE 802.11 standard suggested that the access point does not wait for the time span of a so-called distributed coordination function interframe space (DIFS) and a so-called backoff time but responds instantaneously only after the so-called short interframe space (SIFS). The disadvantage of this kind of solution is that it introduces a non-standard behavior.

The object of the invention is to propose a solution for fast determination of the quality of a radio link in a Wireless Local Area Network (WLAN).

This object is achieved by a method according to the teaching of claim 1, a mobile terminal according to the teaching of claim 4, an access point according to the teaching of claim 10 and program modules according to the teaching of claims 7 and 12.

The invention is based on the insight, that standard measurements with active scanning solutions and existing proprietary solutions always imply that the probe response from the candidate access points have to be awaited. The common shortcoming of these solutions is, that the global measurement time is too long for real time service requirements. Furthermore, when a mobile terminal performs measurements over another channel than the one of its current access point, it can not receive and send user traffic during the measurement time.

The main idea of the invention is that an access point that has received a probe request message from a mobile terminal does not send back a probe response message to the mobile terminal if the mobile terminal has indicated in the probe request message that it intends to perform radio link measurements. Instead of sending a probe response message, the access point only sends an acknowledgement message which will be used by the mobile terminal to perform the measurements. In order that the access point sends back an acknowledgement message, the probe request message must be sent in unicast, i.e. point-to-point and not in broadcast according to the IEEE 802.11 standard. A further embodiment could implement that the access point also replies to a probe request message sent in broadcast with an acknowledgement message.

The mobile terminal initiates a measurement procedure by means of sending probe request messages for each candidate access point in unicast, i.e. a dedicated probe request message will be sent to each candidate access point with a specific service set identifier (SSID). For instance, this specific SSID could be composed in the following way: "used SSID for traffic"+"_"+"MEASUREMENT". By means of the keyword MEASUREMENT, the access point does not send back a probe response message, but only sends back an acknowledgement message as response to the unicast probe request message. It is also possible to use no specific SSID and in this case the access point will have a non-standard behavior.

Preferably, both the uplink and downlink radio links must be measured because the uplink and downlink powers are not necessarily equal. For downlink measurements from the access point to the mobile terminal, an acknowledgement message as response to a unicast probe request message is sufficient. Thus, the solution supports power asymmetry deployment for the radio link between the access point and the mobile terminal.

The proposed solution requires that the access point manages a specific SSID and that the access point preferably ignores this specific SSID when it is probed in broadcast, as in this case no acknowledgement message is sent. This solution also enables to support mobile terminals that are not supporting this solution. It is also possible that the access point responds to this specific SSID when it is probed in broadcast which will enable a mobile terminal supporting the solution to test the solution that is implemented in the access point.

A mobile terminal will be enabled by this solution to perform a measurement in 0.8 ms for each access point at a data rate of 11 Mbit/s instead of about 2 ms for the fast alternative solution of a unicast probe request and a probe response. This delta time is very important because it may be necessary that the mobile terminal performs several measurements for each candidate access point.

The invention preferably uses the well-known principle of the so-called candidate access point list and the corresponding channels, i.e. the mobile terminal knows its adjacent access points together with their corresponding channels and can therefore restrict the number of unicast probe request messages it has to send.

Further developments of the invention can be gathered from the dependent claims and the following description.

In the following the invention will be explained further making reference to the attached drawings.

The WLAN network in which the invention can be implemented comprises at least two access points AP1, AP2 and at least one mobile terminal STA.

The access points AP1, AP2 are both connected to each other via a backbone system and the mobile terminal STA is within the coverage of the radio links of said access points AP1, AP2. The mobile terminal STA is connected via a wireless connection to access point AP1 and can by means of the backbone system be further connected to another mobile terminal within the same WLAN network. Furthermore, said mobile terminal STA can also be connected by means of the backbone system and via gateways to devices like e.g. terminals or servers located in further networks like e.g. the Internet or another mobile or fixed network. Additional access points that can be comprised in the WLAN network may also be connected to each other and/or to said access points AP1, AP2 via a backbone system, and additional mobile terminals that can be comprised in the WLAN network may also be connected to one or more of the additional access points and/or said access points AP1, AP2.

The access points AP1, AP2 comprise the functionality of an access point of a WLAN network, i.e. they provide the possibility for mobile terminals to get connected to the WLAN network. Furthermore, according to the invention the access points AP1, AP2 comprise means to omit sending a probe response message PRE1 and PRE2 resp. to said mobile terminal STA after having received a probe request message PRU1 and PRU2 resp. from said mobile terminal STA.

In another embodiment, the access points AP1, AP2 additionally comprise means for sending an acknowledgement message ACK to said mobile terminal STA after having received the probe request message PRU1 and PRU2 resp. from said mobile terminal STA.

The mobile terminal STA comprises the functionality of a mobile terminal for a WLAN network, i.e. it can be connected to a WLAN network by means of an access point AP1 or AP2. Additionally, the mobile terminal STA comprises means for sending the probe request messages PRU1, PRU2 at least to the access point AP1 and AP2 resp. with said probe request messages PRU1, PRU2 comprising a specific identifier requesting from the receiving access point AP1 and AP2 resp. not to respond with a probe response message PRE1 and PRE2 resp. to the mobile terminal STA.

In another embodiment, the probe request messages PRU1, PRU2 sent from the mobile terminal STA additionally comprise a specific identifier requesting from the receiving access point AP1 and AP2 resp.to respond with an acknowledgement message ACK.

In the following, by way of example the method according to the invention is described in detail and compared with the prior art making reference to FIGS. 1 and 2.

FIG. 1 schematically shows the data transfer belonging to an active scanning procedure according to the IEEE 802.11 standard between two access points AP1 and AP2 and a mobile terminal STA all belonging to the same WLAN network and with the mobile terminal STA being connected to the access point AP1 and also being within the coverage of the radio link of the access point AP2.

The data transfer scheme according to the prior art depicted in FIG. 1 shows in the upper row data packets sent from the mobile terminal STA to the access points AP1 and/or AP2, in the middle row data packets sent from the access point AP1 to the mobile terminal STA and in the lower row data packets sent from the access point AP2 to the mobile terminal STA all plotted against the timeline t.

The active scanning scenario of a radio channel depicted in FIG. 1 starts with the mobile terminal STA broadcasting a probe request message PRB. Subsequent, the mobile terminal STA awaits probe response messages PRE1, PRE2 from the access point AP1 and AP2 resp. that have received the probe request message PRB. If the mobile terminal STA does not receive any probe response messages PRE1, PRE2 within a minimum time span MIN that is depicted by a double arrow in FIG. 1, the mobile terminal STA starts scanning another radio channel. Otherwise, the mobile terminal STA processes all probe response messages PRE1, PRE2 received within a maximum time span MAX that is depicted by the large double arrow in FIG. 1.

After the waiting time DIFS, the access point AP2 is the first to send a probe response message PRE2 to the mobile terminal STA. As the mobile terminal STA receives this response within the minimum time span MIN, the mobile terminal STA has to wait for further probe response messages PRE1, PRE2 to arrive till the maximum time span MAX has elapsed.

After the waiting time SIFS, the mobile terminal STA sends an acknowledgement message ACK as a response to the access point AP2.

Subsequent, after the time span DIFS has elapsed, it is the turn of the access point AP1 to answer the probe request message PRB, but the access point AP1 has to wait till a backoff time BO has elapsed before it is allowed to send the probe response message PRE1. The backoff time BO increases on average with the number of unsuccessful attempts of the access point AP1 to transmit data and decreases every time the sending is deferred caused e.g. by the use of the channel by the access point AP2.

After the time span SIFS has elapsed, the mobile terminal STA sends an acknowledgement message ACK as a response to the access point AP1.

The mobile terminal STA begins with the processing of all received probe response messages PRE1, PRE2 only after the maximum time span MAX has elapsed.

Figure 2:
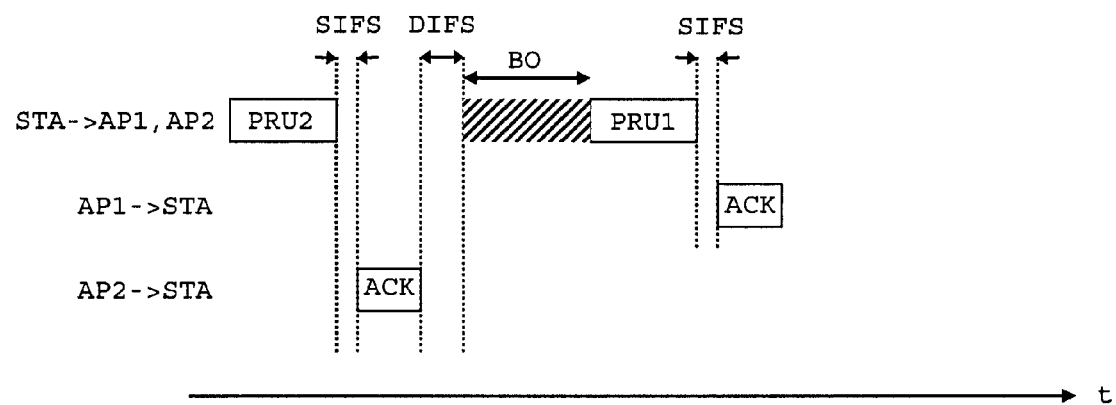

FIG. 2 schematically shows the data transfer according to one embodiment of the invention between the two access points AP1 and AP2 and the mobile terminal STA all belonging to the same WLAN network and with the mobile terminal STA being connected to the access point AP1 and being within the coverage of the radio links of the access points AP1 and AP2. Said data transfer scheme is used in order to perform a method for fast radio link measurements according to the invention.

The data transfer scheme depicted in FIG. 2 shows in the upper row the data packets sent from the mobile terminal STA to the access points AP1 and/or AP2, in the middle row the data packets sent from the access point AP1 to the mobile terminal STA and in the lower row the data packets sent from the access point AP2 to the mobile terminal STA all plotted against the timeline t.

The active scanning scenario of a radio channel depicted in FIG. 2 starts with the mobile terminal STA sending a probe request message PRU2 to the access point AP2 in unicast. The probe request messages PRU1 and PRU2 shall comprise a specific identifier requesting from the receiving access point AP1 and AP2 resp. not to respond with a probe response message PRE1 and PRE2 resp. to the mobile terminal STA. For instance, the probe response messages PRU1 and PRU2 can comprise a specific SSID with an additional keyword as already mentioned above.

Subsequent, after the waiting time SIFS has elapsed, the access point AP2 sends an acknowledgement message ACK to the mobile terminal STA.

The mobile terminal STA, after a waiting time DIFS and a backoff time BO have elapsed, sends a probe request message PRU1 to the access point AP1 in unicast.

After the waiting time SIFS has elapsed, the access point AP1 sends an acknowledgement message ACK to the mobile terminal STA.

In another embodiment of the invention, the mobile terminal STA broadcasts the probe request message PRU1 and said probe request message PRU1 comprises an additional specific identifier requesting from the receiving access point AP1 to respond with an acknowledgement message ACK.

To perform the method according to the invention, the already mentioned principle of the candidate access point list and the corresponding channels is preferably used. Thus, the mobile terminal STA can restrict the sending of probe request messages PRE1, PRE2 to its adjacent access points AP1, AP2.

The mobile terminal STA uses the acknowledgement messages received from the access points AP1, AP2 to perform measurements to determine the downlink radio link quality.

In case of the method according to the invention, the time that elapses till a measurement can be performed is composed of the time span DIFS, a backoff time, the time needed for a probe request message PRU1 or PRU2, the time span SIFS and the time needed for an acknowledgement message ACK which sums up to about 0.8 ms at a data rate of 11 Mbit/s.

In case of the prior art solution of a unicast probe request with a probe response, the time that elapses till a measurement can be performed is composed of the time span DIFS, a backoff time, the time needed for a probe request message PRU1 or PRU2, the time span SIFS, the time needed for an acknowledgement message ACK, the time span DIFS, a backoff time, the time needed for a probe response message PRE1 or PRE2, the time span SIFS and the time needed for an acknowledgement message ACK which sums up to about 2 ms at a data rate of 11 Mbit/s. As already mentioned, this delta time compared to the method according to the invention is very important because it may be necessary that the mobile terminal STA performs several measurements for each candidate access point AP1 or AP2 to get an average measurement.

In case of the solution according to the IEEE 802.11 standard depicted in FIG. 1, the time that elapses after the probe request has been broadcasted till a measurement can be performed is mainly composed of the time span DIFS, the backoff time, the time needed for a probe response message PRE1 or PRE2, the time span SIFS and the time needed for an acknowledgement message ACK. The main difference to the method according to the invention with respect to the time consumption is that in case of the solution depicted in FIG. 1, the mobile terminal STA collects and processes all probe response messages PRE1, PRE2 that arrive within a certain time span MAX. The typical default value for the time span MAX that has to be awaited before the mobile terminal STA begins with processing of all received probe response messages PRE1, PRE2 is about 20 ms and therefore too high to allow for real time services.

Sending the probe request message PRU1 or PRU2 in broadcast with requesting not to send a probe response message PRE1 and PRE2 resp., but to send an acknowledgement message ACK could reduce the time needed for performing radio link measurements using the acknowledgement message ACK even more, as only one probe request message PRU1 or PRU2 must be sent. However, if the probe request message PRU1 or PRU2 is sent in broadcast, the sending can not be restricted to the preselected adjacent access points AP1 and AP2.

The invention claimed is:

1. A method for fast determination of the quality of the radio link from a mobile terminal (STA) to an access point (AP1) in a Wireless Local Area Network according to IEEE 802.11 wherein, after having received a probe request message (PRU1) from the mobile terminal (STA), the access point (AP1) only sends an acknowledgement message (ACK) to said mobile terminal (STA) and that the acknowledgement message (ACK) is used to perform radio link measurements, wherein a radio link measurement is performed immediately after a time span substantially equal to a sum of the time periods needed for a short interframe space (SIFS), the acknowledgement message, a backoff time, a distributed coordination function interframe space (DIFS), and the probe request message.

2. A method according to claim 1, wherein said probe request message (PRU1) is unicast.

3. A mobile terminal (STA) for communicating within a Wireless Local Area Network according to IEEE 802.11 comprising means for sending a probe request message (PRU1) to at least one access point (AP1) wherein the probe request message (PRU1) comprises a specific identifier requesting from the at least one access point (AP1) not to respond with a probe response message (PRE1) to the mobile terminal (STA), but to respond with an acknowledgement message (ACK) to the mobile terminal (STA), wherein the acknowledgement message is sent within a time span substantially equal to a sum of the time periods needed for a short interframe space (SIFS), the acknowledgement message, a backoff time, a distributed coordination function interframe space (DIFS), and the probe request message, wherein a radio link measurement is performed immediately after the time span.

4. A mobile terminal (STA) according to claim 3 wherein said mobile terminal (STA) comprises means to receive an acknowledgement message (ACK) from the at least one access point (AP1) in response to said probe request message (PRU1) that has been sent to the at least one access point (AP1).

5. A mobile terminal (STA) comprising a program module, wherein the program module comprises a code means for sending a probe request message (PRU1) to at least one access point (AP1) for communicating within a Wireless Local Area Network according to IEEE 802.11 wherein the probe request message (PRU1) comprises a specific identifier requesting from the at least one access point (AP1) not to respond with a probe response message (PRE1) to the mobile terminal (STA), but to respond with an acknowledgement message (ACK) to the mobile terminal (STA), wherein the acknowledgement message is sent within a time span substantially equal to a sum of the time periods needed for a short interframe space (SIFS), the acknowledgement message, a backoff time, a distributed coordination function interframe space (DIFS), and the probe request message, wherein a radio link measurement is performed immediately after the time span.

6. A mobile terminal according to claim 5, wherein the mobile terminal receives an acknowledgement message (ACK) from the at least one access point (AP1) in response to said probe request message (PRU1).

7. An access point (AP1) for communicating within a Wireless Local Area Network according to IEEE 802.11 comprising at least one mobile terminal (STA) wherein the access point (AP1) comprises means to omit sending a probe response message (PRE1) to the mobile terminal (STA) after having received a probe request message (PRU1) from said mobile terminal (STA) and comprises means for sending an acknowledgement message (ACK) to said mobile terminal (STA) after having received the probe request message (PRU1) from said mobile terminal (STA), wherein the acknowledgement message is sent within a time span substantially equal to a sum of the time periods needed for a short interframe space (SIFS), the acknowledgement message, a backoff time, a distributed coordination function interframe space (DIFS), and the probe request message, wherein a radio link measurement is performed immediately after the time span.

8. An access point (AP1) comprising a code means for communicating within a Wireless Local Area Network (WLAN) according to IEEE 802.11, wherein the WLAN comprises at least one mobile terminal (STA), wherein if the program module is activated, only an acknowledgement message (ACK) is sent to the mobile terminal (STA) after having received a probe request message (PRU1) from said mobile terminal (STA), wherein the acknowledgement message is sent within a time span substantially equal to a sum of the time periods needed for a short interframe space (SIFS), the acknowledgement message, a backoff time, a distributed coordination function interframe space (DIFS), and the probe request message, wherein a radio link measurement is performed immediately after the time span.

* * * * *